US012693179B2

(12) United States Patent
Dutta et al.

(10) Patent No.: US 12,693,179 B2
(45) Date of Patent: Jul. 28, 2026

(54) MULTI-DIMENSIONAL STRAIN SENSING DEVICE, METHOD FOR SENSING TYPES OF EXTERNAL MOTIONS AND FOR FORMING TERNARY VALUED LOGIC DEVICE BY THE SAME, AND TERNARY VALUED LOGIC SYSTEM

(71) Applicant: NATIONAL CHENG KUNG UNIVERSITY, Tainan City (TW)

(72) Inventors: Jit Dutta, Tainan City (TW); Chuan Pu Liu, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 283 days.

(21) Appl. No.: 18/219,300

(22) Filed: Jul. 7, 2023

(65) Prior Publication Data

US 2025/0012645 A1    Jan. 9, 2025

(51) Int. Cl.
*G01L 1/16* (2006.01)
(52) U.S. Cl.
CPC ...................................... *G01L 1/16* (2013.01)
(58) Field of Classification Search
CPC . G01L 1/16; G01L 2009/0069; G01L 19/146; G01L 1/167; G01L 1/20; G01L 1/18; G01L 5/162; G06F 2203/04103; G01N 27/125
See application file for complete search history.

(56) References Cited

U.S. PATENT DOCUMENTS

2010/0301706 A1* 12/2010 Koury, Jr. ............... G01L 9/008
310/338
2016/0240766 A1* 8/2016 Al Ahmad ............. H10D 48/50
2018/0149525 A1* 5/2018 Yoon ..................... H10N 30/302
2019/0072374 A1* 3/2019 Mann ....................... G01B 7/24

* cited by examiner

*Primary Examiner* — Stephen D Meier
*Assistant Examiner* — Quang X Nguyen
(74) *Attorney, Agent, or Firm* — Maschoff Brennan

(57) ABSTRACT

A multi-dimensional strain sensing device includes a flexible substrate, two piezoelectric semiconducting films, a first pair of electrodes and a second pair of electrodes. The two piezoelectric semiconducting films are formed on opposite sides of the flexible substrate respectively. The first pair of electrodes are formed on one of the two piezoelectric semiconducting films and opposite to the flexible substrate. The second pair of electrodes are formed on the other one of the two piezoelectric semiconducting films and opposite to the flexible substrate. The present disclosure further proposes a method for sensing types of external motions by the multi-dimensional strain sensing device, a method for forming a ternary valued logic device by the multi-dimensional strain sensing device and a ternary valued logic system.

5 Claims, 10 Drawing Sheets

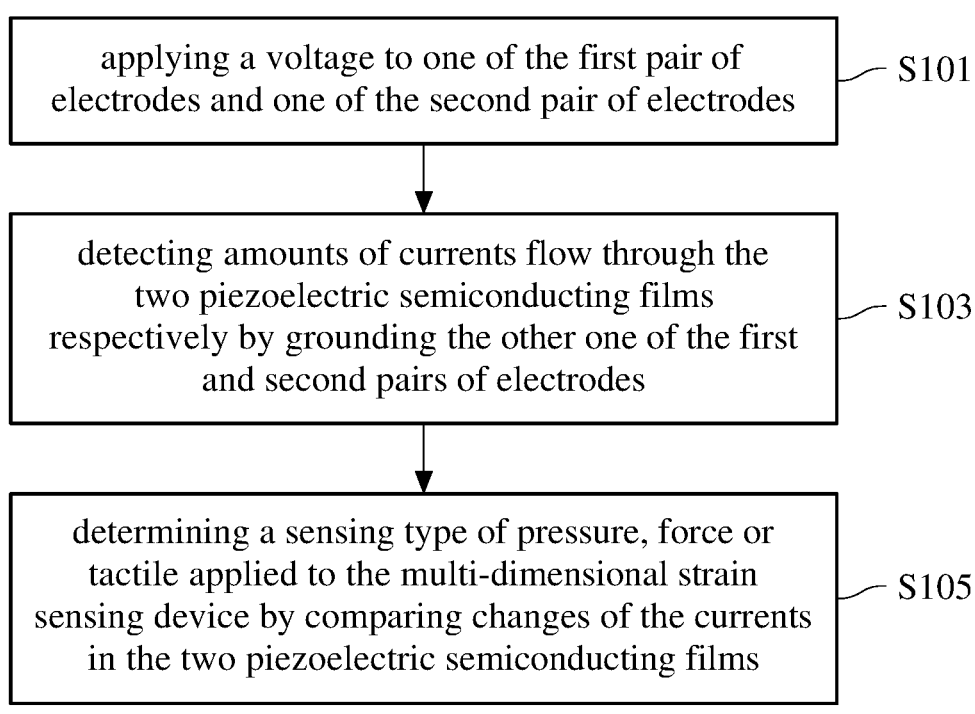

| applying a voltage to one of the first pair of electrodes and one of the second pair of electrodes | S101 |

| detecting amounts of currents flow through the two piezoelectric semiconducting films respectively by grounding the other one of the first and second pairs of electrodes | S103 |

| determining a sensing type of pressure, force or tactile applied to the multi-dimensional strain sensing device by comparing changes of the currents in the two piezoelectric semiconducting films | S105 |

FIG. 4

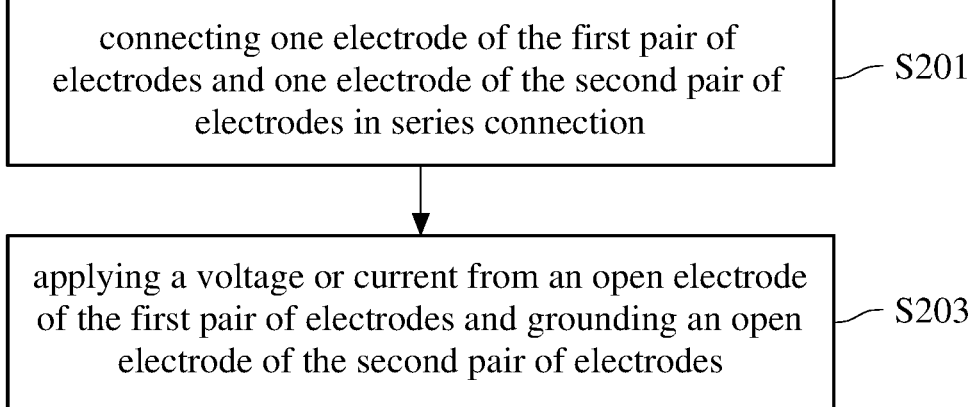

| connecting one electrode of the first pair of electrodes and one electrode of the second pair of electrodes in series connection | S201 |

| applying a voltage or current from an open electrode of the first pair of electrodes and grounding an open electrode of the second pair of electrodes | S203 |

FIG. 5

MULTI-DIMENSIONAL STRAIN SENSING DEVICE, METHOD FOR SENSING TYPES OF EXTERNAL MOTIONS AND FOR FORMING TERNARY VALUED LOGIC DEVICE BY THE SAME, AND TERNARY VALUED LOGIC SYSTEM

BACKGROUND

1. Technical Field

This disclosure relates to a multi-dimensional strain sensing device, method for sensing types of external motions and for forming ternary valued logic device by the same, and ternary valued logic system.

2. Related Art

The development of nano devices, smart sensors, and advanced electronics demands compliance with the concern of energy efficiency in the era of increasing awareness of green energy and environmental sustainability. While several approaches have been taken to enhance energy efficiency at the device level, developing better energy-efficient materials and implementing multi-purpose components have attracted more attention

SUMMARY

Accordingly, this disclosure provides a multi-dimensional strain sensing device, method for sensing types of external motions and for forming ternary valued logic device by the same, and ternary valued logic system.

According to one or more embodiment of this disclosure, a multi-dimensional strain sensing device includes a flexible substrate, two piezoelectric semiconducting films, a first pair of electrodes and a second pair of electrodes. The two piezoelectric semiconducting films are formed on opposite sides of the flexible substrate respectively. The first pair of electrodes are formed on one of the two piezoelectric semiconducting films and opposite to the flexible substrate. The second pair of electrodes are formed on the other one of the two piezoelectric semiconducting films and opposite to the flexible substrate.

According to one or more embodiment of this disclosure, a method for sensing types of external motions by the multi-dimensional strain sensing device includes: applying a voltage to one of the first pair of electrodes and one of the second pair of electrodes; detecting amounts of currents flow through the two piezoelectric semiconducting films respectively by grounding the other one of the first and second pairs of electrodes determining a sensing type of pressure, force or tactile applied to the multi-dimensional strain sensing device by comparing changes of the currents in the two piezoelectric semiconducting films.

According to one or more embodiment of this disclosure, a method for forming a ternary valued logic device by the multi-dimensional strain sensing device includes: connecting one electrode of the first pair of electrodes and one electrode of the second pair of electrodes in series connection; and applying a voltage or current from an open electrode of the first pair of electrodes and grounding an open electrode of the second pair of electrodes, wherein the open electrode applied with the voltage or current serves as an input terminal of the ternary valued logic device, the open electrode that is grounded serves as a grounded terminal of the ternary valued logic device, and the one electrode of the first pair of electrodes and the one electrode of the second pair of electrodes serve as a linked terminal of the ternary valued logic device, wherein a response of the ternary valued logic device is obtained by measuring a voltage across the linked terminal and the grounded terminal.

According to one or more embodiment of this disclosure, a ternary valued logic system includes a first sensing device and a second sensing device each of which is the multi-dimensional strain sensing device. One electrode of the first pair of electrodes of the first sensing device is connected in series with one electrode of the first pair of electrodes of the second sensing device, one electrode of the second pair of electrodes of the first sensing device is connected in parallel with one electrode of the second pair of electrodes of the second sensing device, and the other electrode of the second pair of electrodes of the first sensing device and the other electrode of the second pair of electrodes of the second sensing device are grounded.

In view of the above description, the multi-dimensional strain sensing device according to one or more embodiments of the present disclosure allows separation and quantification of individual strains, and has low power consumption. The ternary valued logic device according to one or more embodiments of the present disclosure may serve as a simple ternary inverter logic (STI). Further, the ternary valued logic system according to one or more embodiments of the present disclosure has advanced logic functions, which can be extended to develop more logic devices. The multi-dimensional strain sensing device, method for sensing types of external motions and for forming ternary valued logic device by the same, and ternary valued logic system paves the way for the development of low-powered and energy-efficient devices in the field of materials science and nano technology, which can have significant implications in various areas, including human-machine interaction, soft robotics and structural health monitoring.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 4 is a flowchart illustrating a method for sensing types of external motions by the multi-dimensional strain sensing device according to an embodiment of the present disclosure;

FIG. 5 is a flowchart illustrating a method for forming a ternary valued logic device by the multi-dimensional strain sensing device according to an embodiment of the present disclosure;

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
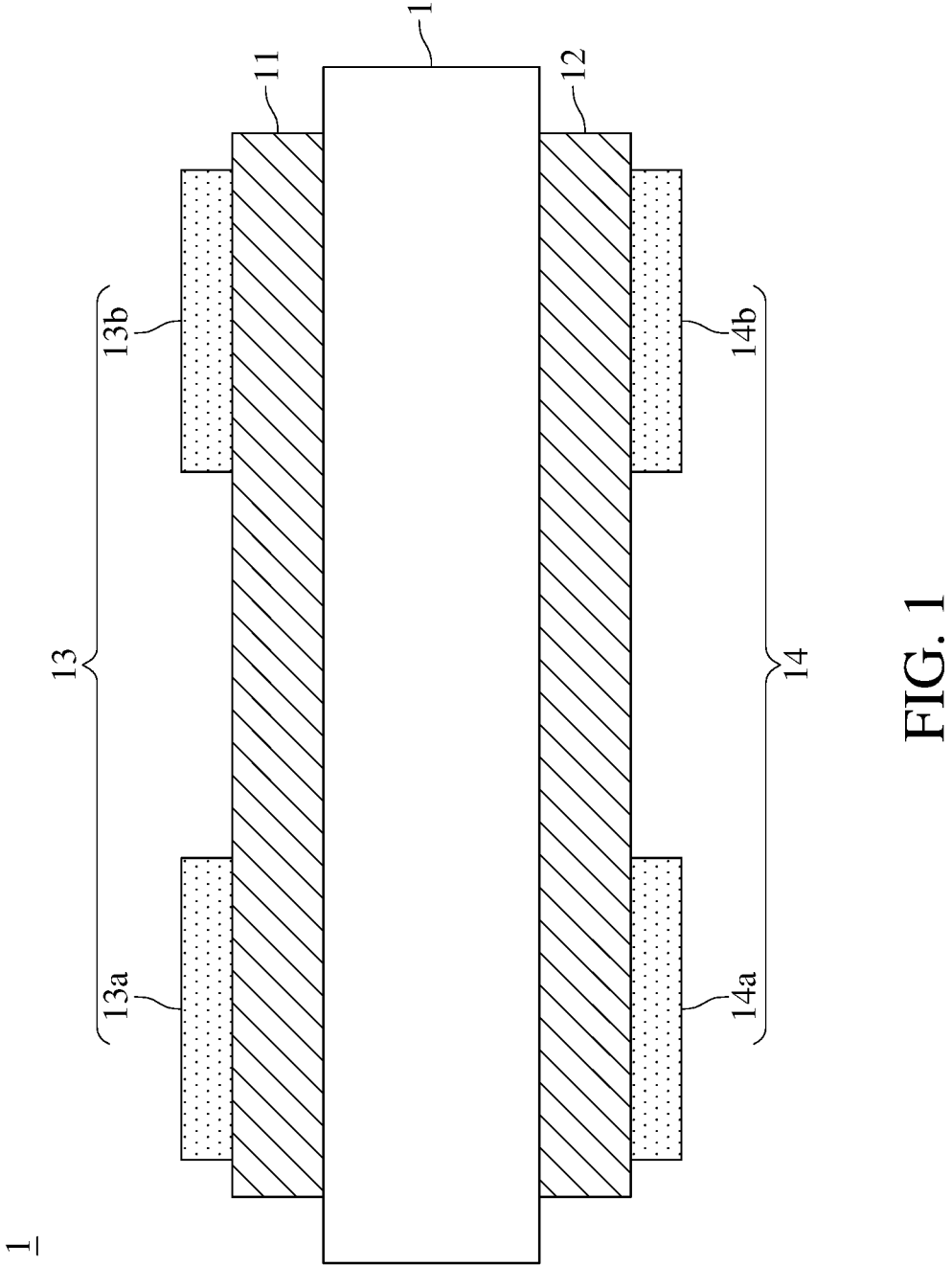
FIG. 1 is a schematic diagram illustrating a multi-dimensional strain sensing device according to an embodiment of the present disclosure.

Please refer to FIG. 1 which is a schematic diagram illustrating a multi-dimensional strain sensing device according to an embodiment of the present disclosure. As shown in FIG. 1, the multi-dimensional strain sensing device 1 includes a flexible substrate 10, two piezoelectric semiconducting films 11 and 12, a first pair of electrodes 13 and a second pair of electrodes 14. The flexible substrate 10 may be a mica substrate. The two piezoelectric semiconducting films 11 and 12 may be made of zinc oxide. The resistance of the two piezoelectric semiconducting films 11 and 12 may be around 3.1±0.1 MΩ. The first pair of electrodes 13 and the second pair of electrodes 14 may be both made of titanium.

The two piezoelectric semiconducting films 11 and 12 are formed on opposite sides of the flexible substrate 10 respectively. Specifically, the two piezoelectric semiconducting films 11 and 12 are a first piezoelectric semiconducting film 11 and a second piezoelectric semiconducting film 12. The first piezoelectric semiconducting film 11 is formed on one side of the flexible substrate 10, and the second piezoelectric semiconducting film 12 is formed on the other side of the flexible substrate 10. An interface of the first piezoelectric semiconducting film 11 close to (contacting) the flexible substrate 10 is preferably zinc-terminated, and the other interface of the first piezoelectric semiconducting film 11 away from (not contacting) the flexible substrate 10 is preferably oxide-terminated. Similarly, an interface of the second piezoelectric semiconducting film 12 close to (contacting) the flexible substrate 10 is preferably zinc-terminated, and the other interface of the second piezoelectric semiconducting film 12 away from (not contacting) the flexible substrate 10 is preferably oxide-terminated.

The first pair of electrodes 13 are formed on the first piezoelectric semiconducting film 11 and opposite to the flexible substrate 10. The second pair of electrodes 14 are formed on the second piezoelectric semiconducting film 12 and opposite to the flexible substrate 10.

The fabrication process of the multi-dimensional strain sensing device 1 may include: sputtering the first piezoelectric semiconducting film 11 on one side of the flexible substrate 10 and sputtering the second piezoelectric semiconducting film 12 on the opposite side of the flexible substrate 10; and depositing the first pair of electrodes 13 on the first piezoelectric semiconducting film 11 and the second pair of electrodes 14 on the second piezoelectric semiconducting film 12.

The first piezoelectric semiconducting film 11 and the second piezoelectric semiconducting film 12 may have the same size and shape; the first piezoelectric semiconducting film 11 and the second piezoelectric semiconducting film 12 may also have different sizes and shapes. Electrodes 13a and 13b of the first pair of electrodes 13 and electrodes 14a and 14b of the second pair of electrodes 14 may have the same size and shape; the electrodes 13a and 13b of the first pair of electrodes 13 and the electrodes 14a and 14b of the second pair of electrodes 14 may also have different sizes and shapes.

The thickness of the flexible substrate 10 may be around 40 um, and the thickness of both the first piezoelectric semiconducting film 11 and the second piezoelectric semiconducting film 12 may be around 300 nm, the present disclosure is not limited thereto. The conductance of the first piezoelectric semiconducting film 11 and the conductance of the second piezoelectric semiconducting film 12 are preferably similar. For example, a difference in between the conductance of the first piezoelectric semiconducting film 11 and the second piezoelectric semiconducting film 12 should be less than less than 10%.

When the entire the first piezoelectric semiconducting film 11 and the second piezoelectric semiconducting film 12 experience a compressive force in the lateral direction, a tensile force is generated in the vertical direction. Accordingly, positive piezopotential is generated on the first piezoelectric semiconducting film 11 close to (contacting) the flexible substrate 10 and the second piezoelectric semiconducting film 12 close to (contacting) the flexible substrate 10, and negative piezopotential is generated on the first piezoelectric semiconducting film 11 away from (not contacting) the flexible substrate 10 and the second piezoelectric semiconducting film 12 away from (not contacting) the flexible substrate 10, thereby creating a depletion region in the surface where said negative piezopotential is generated.

Because the first piezoelectric semiconducting film 11 and the second piezoelectric semiconducting film 12 are thinner than the flexible substrate 10, when the entire the first piezoelectric semiconducting film 11 and the second piezoelectric semiconducting film 12 experience a tensile force in the lateral direction, a compressive force is generated in the vertical direction. Accordingly, positive piezopotential is generated on the first piezoelectric semiconducting film 11 away from (not contacting) the flexible substrate 10 and the second piezoelectric semiconducting film 12 away from (not contacting) the flexible substrate 10, and negative piezopotential is generated on the first piezoelectric semiconducting film 11 close to (contacting) the flexible substrate 10 and the second piezoelectric semiconducting film 12 close to (contacting) the flexible substrate 10, thereby causing the conductance to increase in the surface where said positive piezopotential is generated. However, due to the fact that the first piezoelectric semiconducting film 11 and the second piezoelectric semiconducting film 12 are thinner than the flexible substrate 10, under the bending strain, such as positive bending, the first piezoelectric semiconducting film 11 experiences tensile force in vertical direction and the second piezoelectric semiconducting film 12 experiences compressive force in the vertical direction, and vice-versa under negative strain.

Said lateral direction represents a direction parallel to the surface of the flexible substrate 10, and said vertical direction represents a direction vertical to the surface of the flexible substrate 10.

Figure 2:
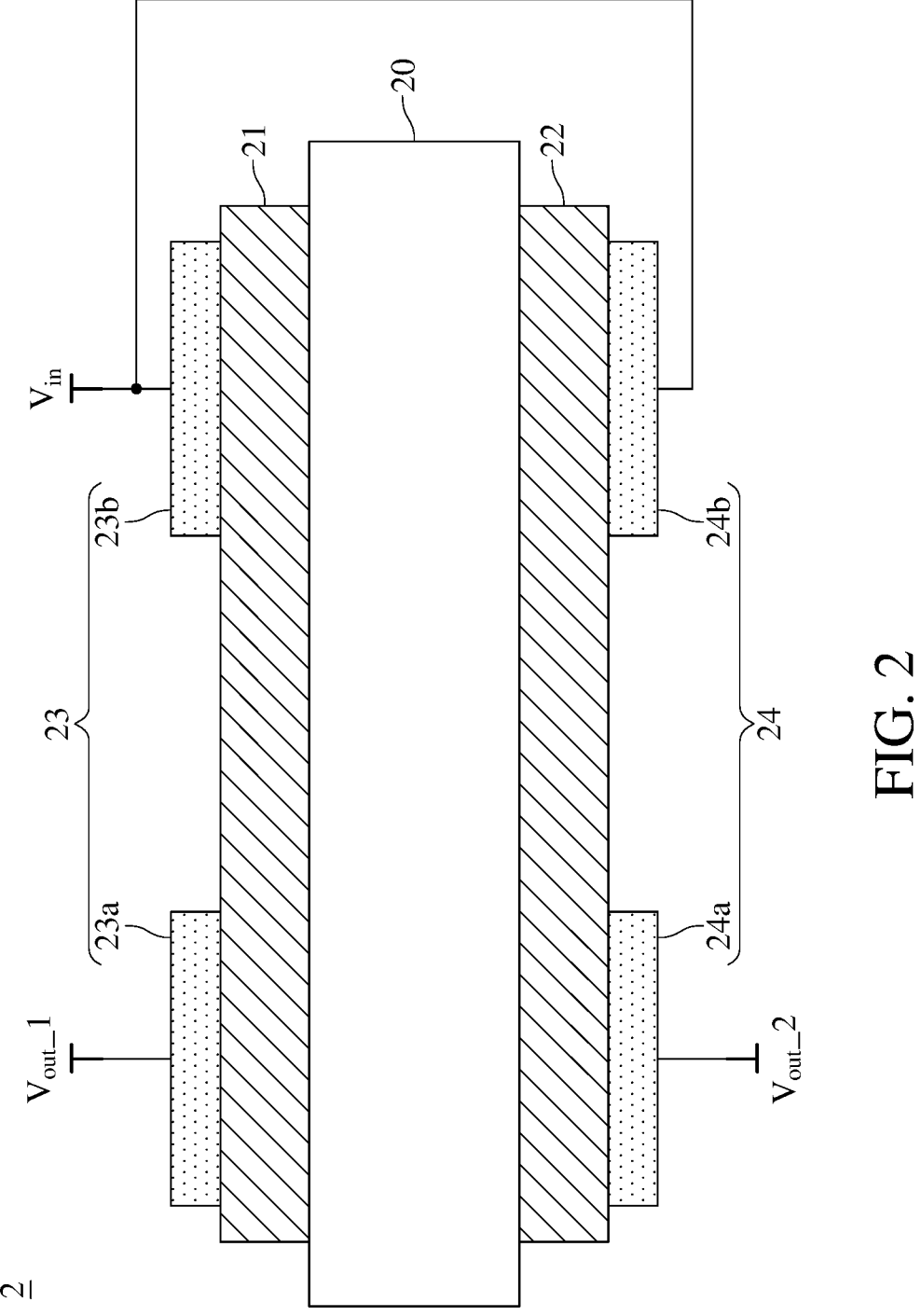
FIG. 2 is a schematic diagram illustrating the multi-dimensional strain sensing device configuration with the external circuit according to another embodiment of the present disclosure.

Please refer to FIG. 2, wherein FIG. 2 is a schematic diagram illustrating the multi-dimensional strain sensing device configuration with the external circuit according to another embodiment of the present disclosure. As shown in FIG. 2, the ternary valued logic device 2 includes a flexible substrate 20, two piezoelectric semiconducting films 21 and 22, a first pair of electrodes 23 and a second pair of electrodes 24. The flexible substrate 20, the two piezoelectric semiconducting films 21 and 22, the first pair of electrodes 23 and the second pair of electrodes 24 may be the same as that of the multi-dimensional strain sensing device 1 of FIG. 1, their descriptions are not repeated herein.

As shown in FIG. 2, the electrode 23b and the electrode 24b are connected in series. A voltage Vin (or current) is applied to the electrode 23b. A voltage Vout_1 measured from the electrode 23a and a voltage Vout_2 measured from the electrode 24a indicate the sensing type of pressure, force or tactile applied to the ternary valued logic device 2 as described above.

Figure 3:
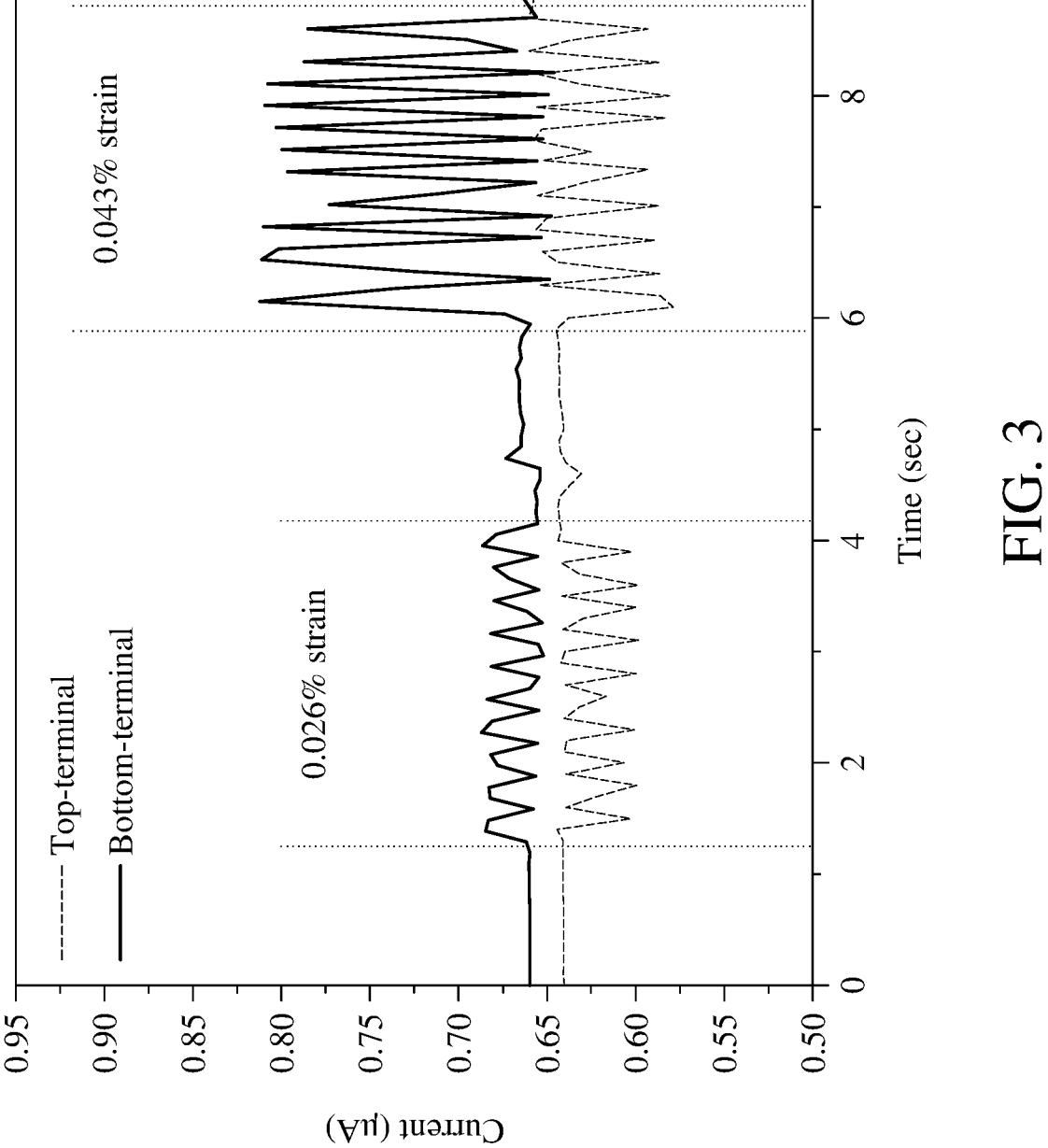
FIG. 3 is a graph showing current-time curves representing response of the ternary valued logic device under bending strain.

Please refer to FIG. 2 and FIG. 3. FIG. 3 is a graph showing current-time curves representing response of the ternary valued logic device under bending strain. FIG. 3 shows the response of the multi-dimensional strain sensing device under consecutive positive bending strain of 0.026% and 0.043% under 2V bias, where current-time measurement is conducted. In FIG. 3, the "top-terminal" represents the first piezoelectric semiconducting film 21, and the "bottom-terminal" represents the second piezoelectric semiconducting film 22. As shown in FIG. 3, the current signal is proportional to the bending strain, and that the first piezoelectric semiconducting film 21 and the second piezoelectric semiconducting film 22 have nearly symmetric response.

Further, the gauge factor (GF) of the first piezoelectric semiconducting film 21 and the second piezoelectric semiconducting film 22 under positive and negative bending strains are −3.44/+9.78 and +5.44/−4.03, respectively, and +94.93/+74.70 for compressive load. Notably, the gauge factor of both the first piezoelectric semiconducting film 21 and the second piezoelectric semiconducting film 22 is asymmetric under two bending types of loads, whereas symmetric under compressive load. This unique behavior makes the multi-dimensional strain detection possible.

Accordingly, the multi-dimensional strain sensing device according to one or more embodiments of the present disclosure is able to identify whether the applied strain is a bending force acting either upward or downward and/or compression from both sides of the two piezoelectric semiconducting films. That is, the multi-dimensional strain sensing device according to one or more embodiments of the present disclosure allows separation and quantification of individual strains, and has low power consumption. Furthermore, this multi-dimensional strain sensing device also could work as a strain-driven ternary valued logic device and/or logic system to obtain energy efficient smart device which can perform complex logic functions from tactile forces.

Please refer to FIG. 1 and FIG. 4. FIG. 4 is a flowchart illustrating a method for sensing types of external motions by the multi-dimensional strain sensing device according to an embodiment of the present disclosure. As shown in FIG. 4, the method for sensing types of external motions by the multi-dimensional strain sensing device includes: step S101: applying a voltage to one of the first pair of electrodes and one of the second pair of electrodes; S103: detecting amounts of currents flow through the two piezoelectric semiconducting films respectively by grounding the other one of the first and second pairs of electrodes; and step S105: determining a sensing type of pressure, force or tactile applied to the multi-dimensional strain sensing device by comparing changes of the currents in the two piezoelectric semiconducting films.

In step S101, a voltage is applied to one of the first pair of electrodes 13 and the second pair of electrodes 14. For example, the voltage is applied to the electrode 13a of the first pair of electrodes 13. It should be noted that the electrode 13a used herein are merely examples. For example, the voltage applied to the electrode 13a and the electrode 14a may be 2V.

In step S103, amounts of currents flow through the first piezoelectric semiconducting film 11 and the second piezoelectric semiconducting film 12 are detected by grounding the other one of the first pair of electrodes 13 and the second pair of electrodes 14. For example, amounts of currents flow through the first piezoelectric semiconducting film 11 and the second piezoelectric semiconducting film 12 are detected by grounding the electrode 14a of the second pair of electrodes 14. The currents may be detected by an ammeter or a galvanometer, the present disclosure is not limited thereto. Alternatively, a voltage difference between the electrode 13b and the electrode 14b is measured to obtain amounts of currents flow through the first piezoelectric semiconducting film 11 and the second piezoelectric semiconducting film 12.

In step S105, the sensing type of pressure, force or tactile applied to the multi-dimensional strain sensing device 1 is determined by comparing changes of the currents in the first piezoelectric semiconducting film 11 and the second piezoelectric semiconducting film 12. Said comparison may be made by laboratory personnel or any computing device that can perform computation. For example, the computing device may include one or more processors, and the processor may be CPU, GPU, microcontroller, a programmable logic controller, etc.

When the current changes indicate a decrease in the current measured from the electrode 13b and an increase in the current measured from the electrode 14b, the sensing type may be determined as a positive strain where the multi-dimensional strain sensing device 1 is bent inwardly toward the first piezoelectric semiconducting film 11. That is, when the current changes indicate a decrease in the current measured from the electrode 13b and an increase in the current measured from the electrode 14b, a lateral compressive force is applied on the first piezoelectric semiconducting film 11 and a lateral tensile force is applied on the second piezoelectric semiconducting film 12.

When the current changes indicate an increase in the current measured from the electrode 13b and a decrease in the current measured from the electrode 14b, the sensing type may be determined as a negative strain where the multi-dimensional strain sensing device 1 is bent inwardly toward the second piezoelectric semiconducting film 12. That is, when the current changes indicate an increase in the current measured from the electrode 13b and a decrease in the current measured from the electrode 14b, a lateral tensile force is applied on the first piezoelectric semiconducting film 11 and a lateral compressive force is applied on the second piezoelectric semiconducting film 12.

By Poisson effect, a compressive strain in the lateral directions is converted to a tensile strain in the vertical direction, which generates positive piezopotential on the zinc-terminated surface of the piezoelectric semiconducting film and negative piezopotential on the oxide-terminated surface of the piezoelectric semiconducting film, and vice versa. On the other hand, the lateral tensile force generates a passive compressive strain in the vertical direction, which then generates a positive piezopotential on the oxide-terminated surface.

Figure 6:
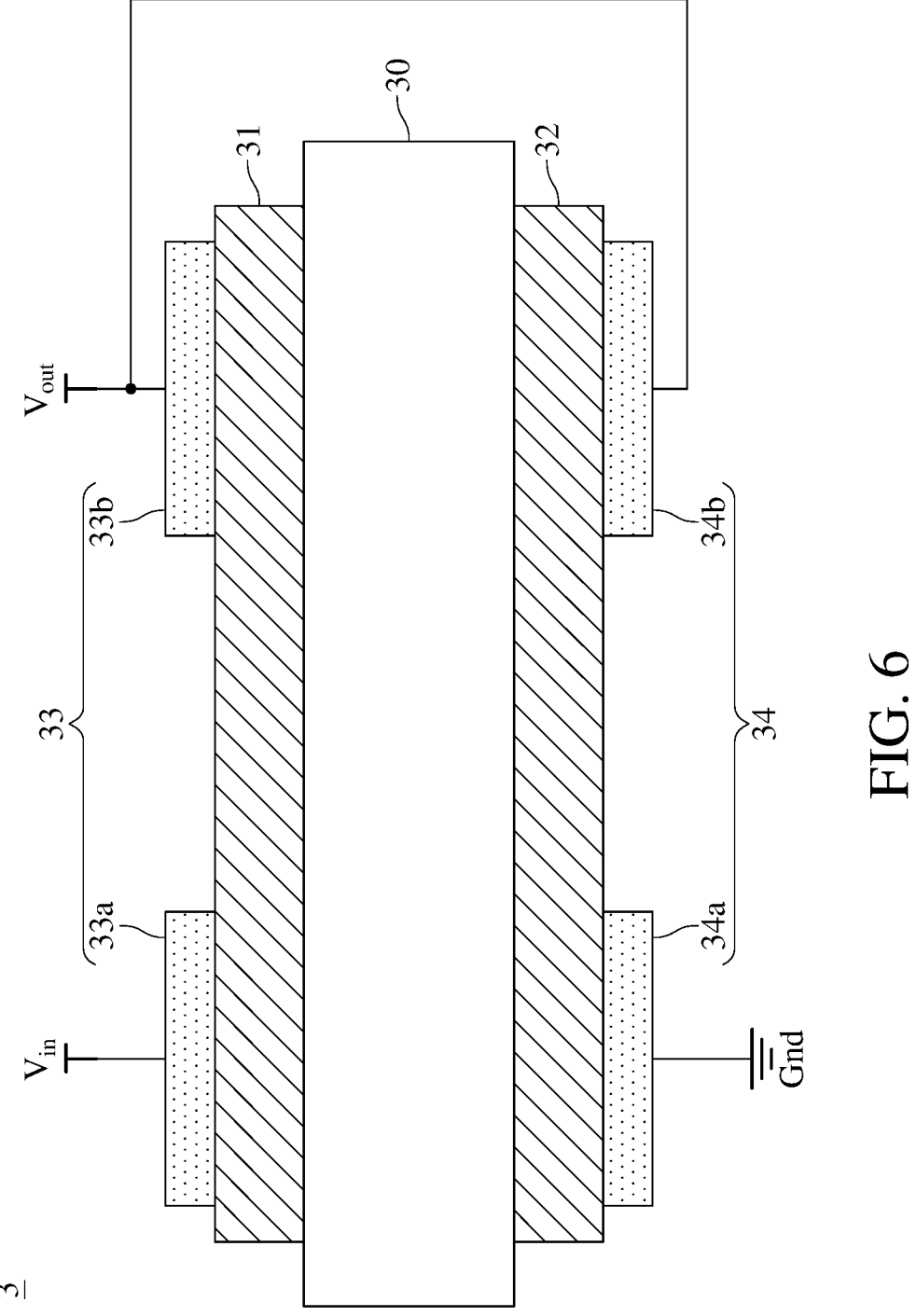
FIG. 6 is a schematic diagram illustrating a ternary valued logic device according to an embodiment of the present disclosure.

Please refer to FIG. 5 and FIG. 6. FIG. 5 is a flowchart illustrating a method for forming a ternary valued logic device by the multi-dimensional strain sensing device according to an embodiment of the present disclosure. FIG. 6 is a schematic diagram illustrating a ternary valued logic device according to an embodiment of the present disclosure, wherein a flexible substrate 30, two piezoelectric semiconducting films 31 and 32, a first pair of electrodes 33 and a second pair of electrodes 34 of the ternary valued logic device 3 are the same as that of the multi-dimensional strain sensing device 1 of FIG. 1, their descriptions are not repeated herein.

As shown in FIG. 5, the method includes: step S201: connecting one electrode of the first pair of electrodes and one electrode of the second pair of electrodes in series connection; and step S203: applying a voltage or current from an open electrode of the first pair of electrodes and grounding an open electrode of the second pair of electrodes.

In step S201, the electrode 33b of the first pair of electrodes 33 and the electrode 34b of the second pair of electrodes 34 are connected in series. In step S203, a voltage Vin (or current) is applied to the open electrode 33a of the first pair of electrodes 33, and the open electrode 34a of the second pair of electrodes 34 is connected to ground Gnd.

In the ternary valued logic device 3, the open electrode (electrode 33a) applied with the voltage Vin or current serves as an input terminal of the ternary valued logic device 3; the open electrode (electrode 34a) that is grounded serves as a grounded terminal of the ternary valued logic device 3; and the electrode 33b of the first pair of electrodes 33 and the electrode 34b of the second pair of electrodes 34 serve as a linked terminal of the ternary valued logic device 3. That is, when the electrode 33b and the electrode 34b are connected in series, they act as a voltage divider circuit for the input voltage signal.

Further, a response of the ternary valued logic device 3 is obtained by measuring a voltage Vout across the linked terminal and the grounded terminal. The ternary valued logic device 3 may serve as a simple ternary inverter logic (STI).

Figure 7:
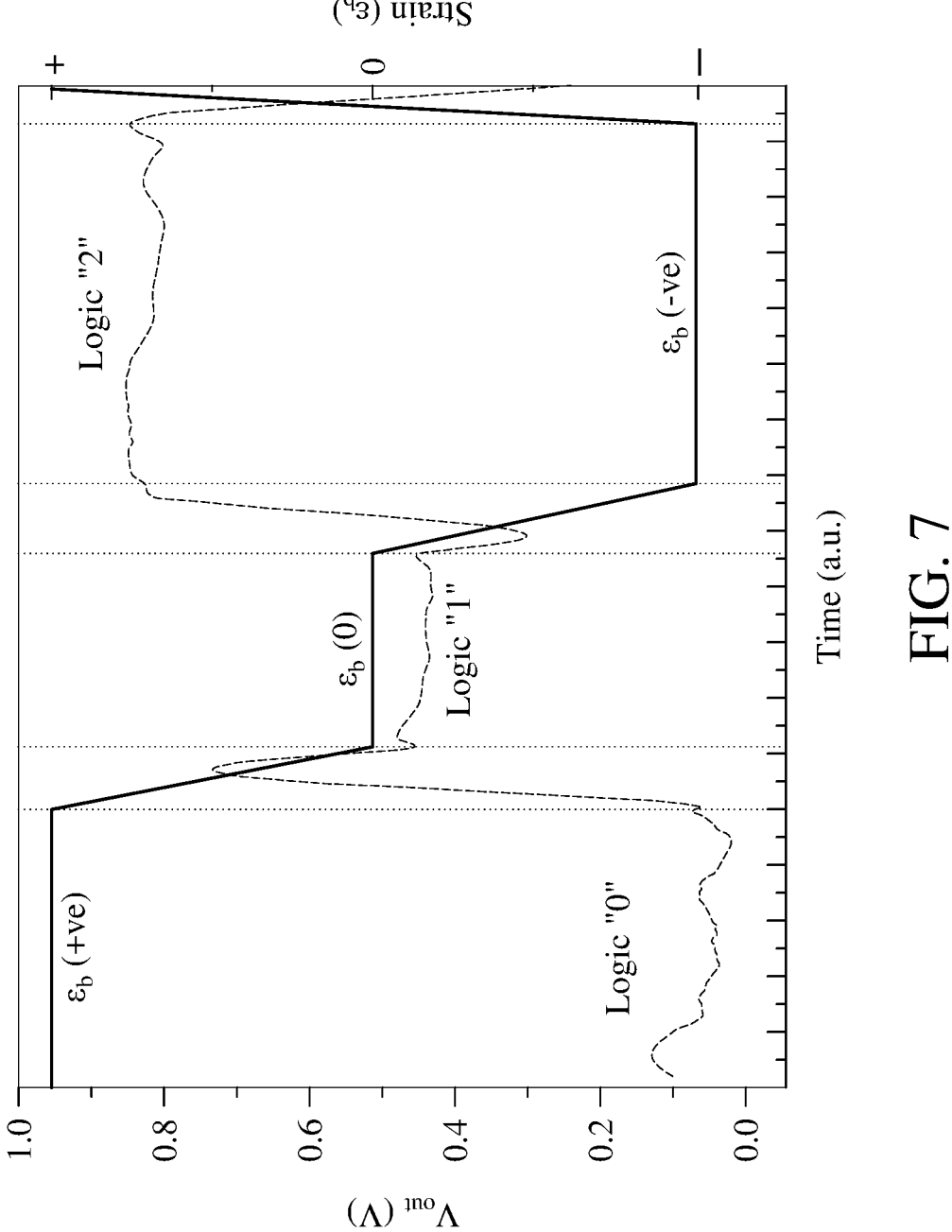
FIG. 7 is a graph showing three distinct stages of output voltage of the ternary valued logic device.

Please refer to FIG. 6 and FIG. 6, wherein FIG. 7 is a graph showing three distinct stages of output voltage of the ternary valued logic device. In FIG. 7, the voltage Vin is 5V. In the ternary valued logic device 3, the three stages may be referred to as true "T", intermediate "I", and false "F". For the strain-based logics, positive strain may be assigned as "T", no strain may be assigned as "I", and negative strain may be assigned as "F". The transition time marked in FIG. 7 denotes the time taken to change the strain conditions.

As shown in FIG. 7, in response to three strain conditions as three different input stages, the normalized output voltage signal is reflected as a logic "0", "1" and "2" corresponding to the input strain condition of "T", "I" and "F", respectively. The truth table is as shown in table 1 below.

TABLE 1

| strain condition | logic output |
|---|---|
| T | 0 |
| I | 1 |
| F | 2 |

Specifically, when the strain condition is in the "T" condition (+ve strain), the first piezoelectric semiconducting film 31 becomes more resistive, and the second piezoelectric semiconducting film 32 becomes more conductive, thereby reducing the voltage drop across the second piezoelectric semiconducting film 32, resulting in a "0" logic output. When the strain condition is in the "F" condition (−ve strain), the first piezoelectric semiconducting film 31 becomes more conductive, and the second piezoelectric semiconducting film 32 becomes more resistive, thereby enhancing the voltage drop across the second piezoelectric semiconducting film 32, resulting in a "2" logic output. When the strain condition is in the "I" condition (no strain), the resistance of the first piezoelectric semiconducting film 31 and the second piezoelectric semiconducting film 32 match. As a result, the voltage drop across the second piezoelectric semiconducting film 32 becomes half of the "2" logic output and results in a "1" logic output. Therefore, the initial impedance (resistance/conductance) of the first piezoelectric semiconducting film 31 and the second piezoelectric semiconducting film 32 preferably match with each other before the ternary valued logic device 3 starts operating.

Figure 8:
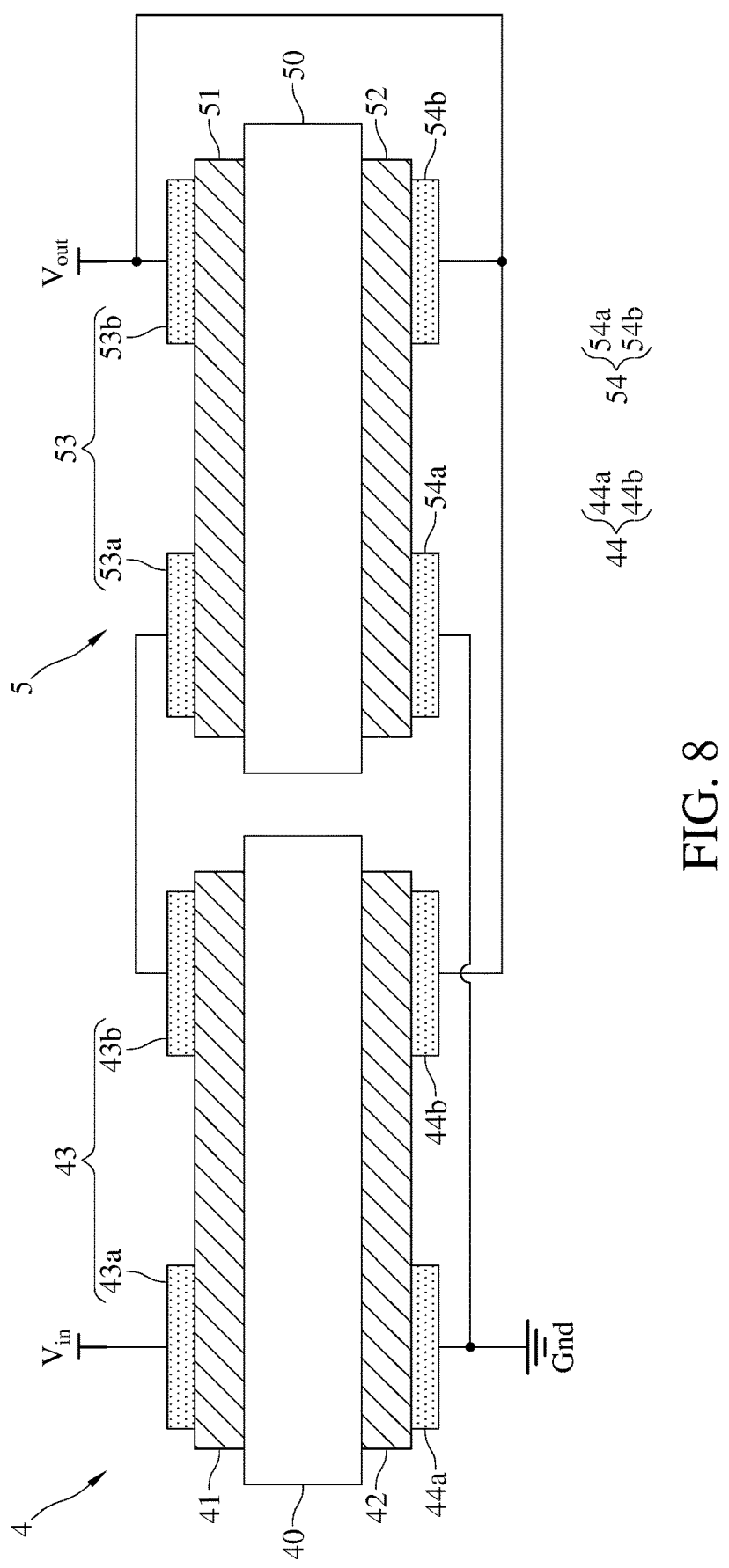
FIG. 8 is a schematic diagram illustrating a ternary valued logic system according to an embodiment of the present disclosure.

Please refer to FIG. 8, wherein FIG. 8 is a schematic diagram illustrating a ternary valued logic system according to an embodiment of the present disclosure. The ternary valued logic system 100 may act as a simple ternary NAND (ST-NAND) logic. As shown in FIG. 8, the ternary valued logic system 100 includes a first sensing device 4 and a second sensing device 5. Each of the first sensing device 4 and the second sensing device 5 are the same as the multi-dimensional strain sensing device 1 shown in FIG. 1, their descriptions are not repeated herein.

The electrode 43b of the first sensing device 4 is connected in series with the electrode 53a of the second sensing device 5. The electrode 44b of the first sensing device 4 is connected in parallel with the electrode 54b of the second sensing device 5. The electrode 53b of the second sensing device 5 is connected in series with the electrode 54b of the second sensing device 5. The electrode 44a of the first sensing device 4 and the electrode 54a of the second sensing device 5 are connected to ground Gnd. In the ternary valued logic system 100, a strain condition of the first sensing device 4 is fixed, a strain condition of the second sensing device 5 is varied, and output voltage Vout of the ternary valued logic system 100 is read between the first pair of electrodes of the sensing device (the second sensing device 5 in this example) that is varied and the second pair of electrodes of the sensing device (the first sensing device 4 in this example) that is fixed. That is, the goal is to measure output of the ternary valued logic system 100 by making any combination of positive bending strain, negative bending strain and no bending strain (zero). For example, the strain condition of the first sensing device 4 is fixed in positive bending strain, the strain condition of the second sensing device 5 is in positive bending strain, and the output voltage Vout of the ternary valued logic system 100 is read; then the strain condition of the first sensing device 4 is still fixed in positive bending strain, and the strain condition of the second sensing device 5 is varied to negative bending strain, and the output voltage Vout of the ternary valued logic system 100 is read, and so on.

Figure 9A:
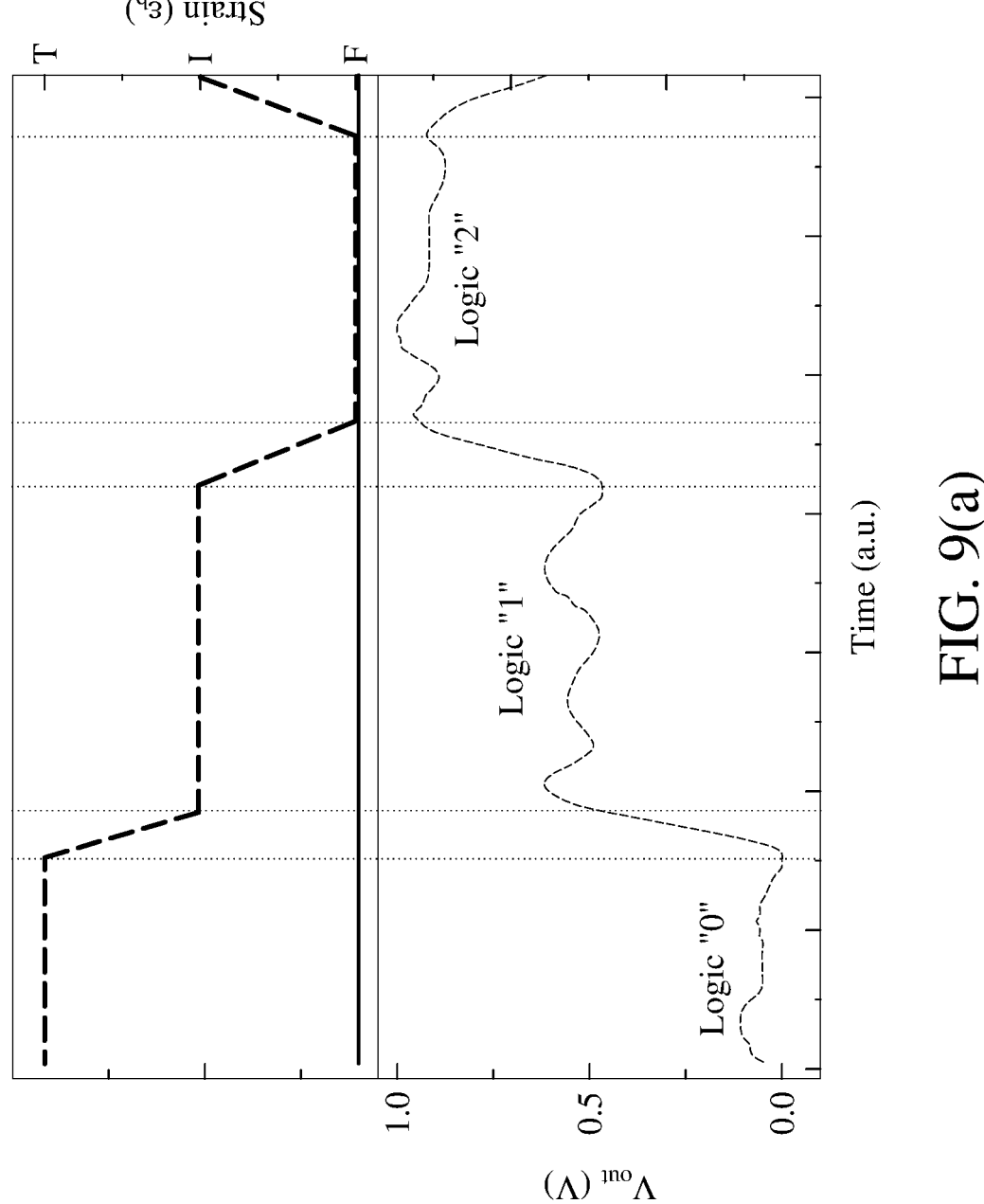
FIG. 9(*a*), FIG. 9(*b*) and FIG. 9(*c*) are graphs showing the response of the ternary valued logic system to three strain conditions.
Figure 9B:
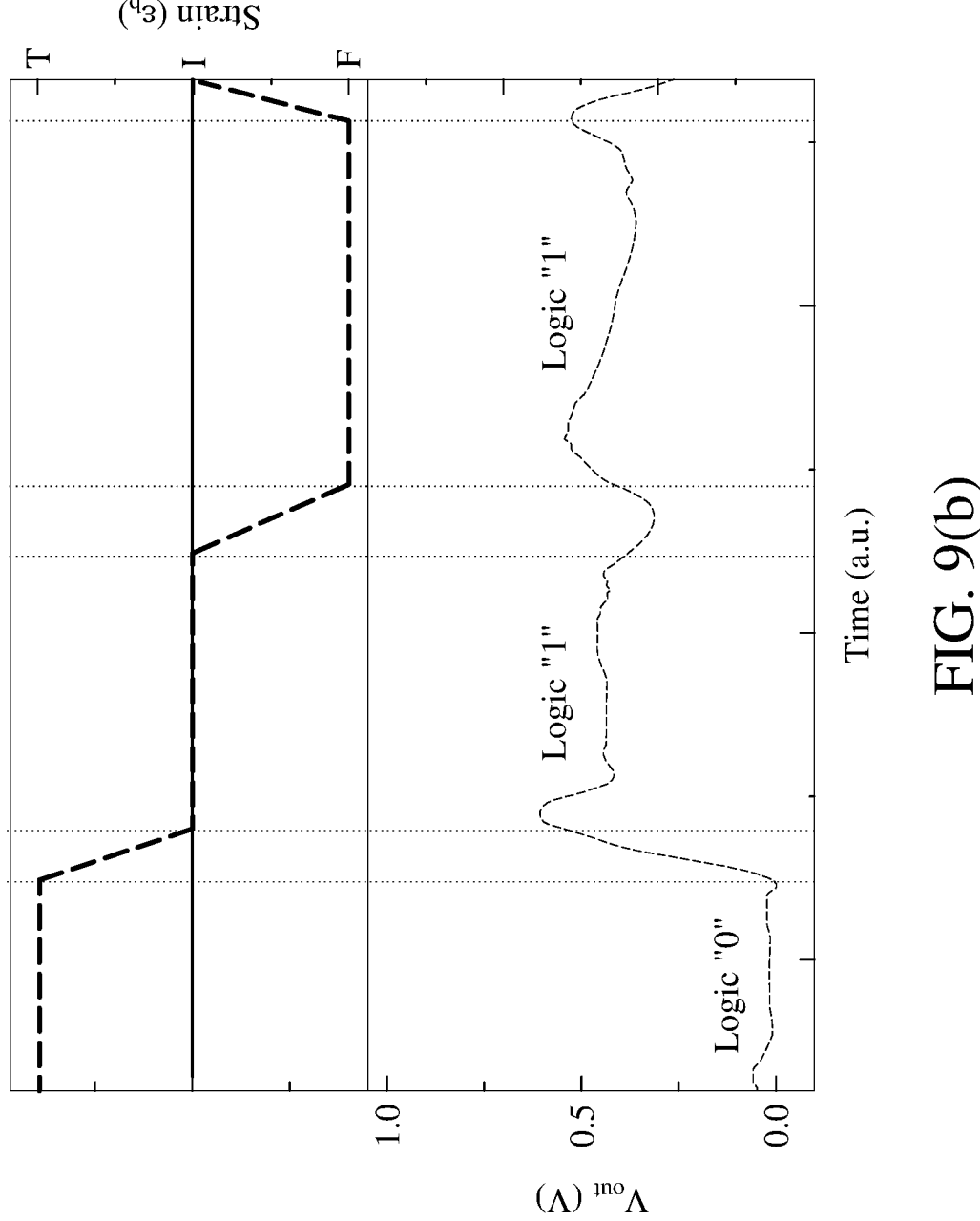
Figure 9C:
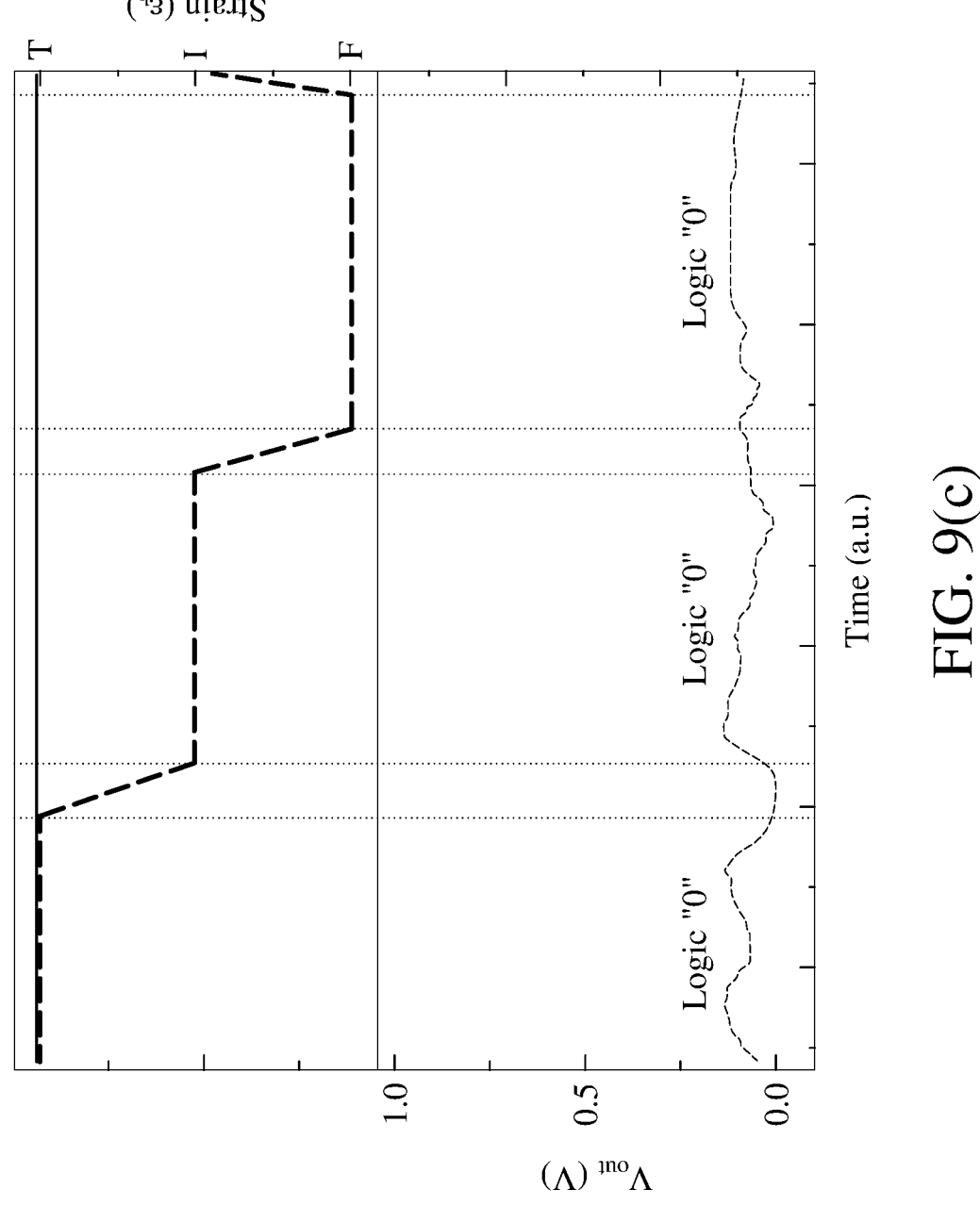

Please refer to FIG. 8 and FIGS. 9(a) to 9(c), wherein FIG. 9(a), FIG. 9(b) and FIG. 9(c) are graphs showing the response of the ternary valued logic system to three strain conditions. In FIG. FIG. 9(a), FIG. 9(b) and FIG. 9(c), the voltage Vin is 5V. The transition time marked in FIGS. 9(a) to 9(c) denotes the time taken to change the strain conditions. For better understanding, the state of the first sensing device 4 is fixed, and the state of the second sensing device 5 is varied, and the output voltage Vout of the ternary valued logic system 100 is read from the electrode 53b. Since each of the first sensing device 4 and the second sensing device 5 has three strain conditions, the output of the ternary valued logic system 100 is demonstrated separately for each strain condition of the first sensing device 4, as shown in FIGS. 9(a) to 9(c).

In FIG. 9(a), the first sensing device 4 is fixed in the strain condition "F", the logic output varies from "0" to "1" to "2" as the second sensing device 5 varies from "T" to "I" to "F" in the ternary NAND operation. In FIG. 9(b), the first sensing device 4 is fixed in the strain condition "I", the logic output varies from "0" to "1" to "1" as the second sensing device 5 varies from "T" to "I" to "F" in the ternary NAND operation. In FIG. 9(c), the first sensing device 4 is fixed in the strain condition "T", the logic output is "0" for all states as the second sensing device 5 varies from "T" to "I" to "F" in the ternary NAND operation. The truth table is as shown in table 2 below.

TABLE 2

| strain condition of the first sensing device 4 | strain condition of the second sensing device 5 | logic output |
| --- | --- | --- |
| F | T | 0 |
| F | I | 1 |
| F | F | 2 |
| I | T | 0 |
| I | I | 1 |
| I | F | 1 |
| T | T | 0 |
| T | I | 0 |
| T | F | 0 |

Specifically, in the ternary valued logic system 100, when the first sensing device 4 is in the strain condition "F", the first piezoelectric semiconducting film 41 is highly conductive, while the second piezoelectric semiconducting film 42 is weakly conductive. Since the electrode 43b and the electrode 53a are connected in series and the electrode 44b and the electrode 54b are connected in parallel, the second sensing device 5 acts as a STI logic with the input signal coming from the first sensing device 4.

When the first sensing device 4 is in the strain condition "I" and the conductance of the first piezoelectric semiconducting film 51 and the second first piezoelectric semiconducting film 52 of the second sensing device 5 decrease and increase (under strain condition "T"), respectively, the logic output is reduced to "0". In all other cases, the logic output remains in a steady "1" due to the dominant strain condition "I" of the first sensing device 4.

When the first sensing device 4 is in the strain condition "T", the first piezoelectric semiconducting film 41 becomes more resistive, and, because of the series connection of the electrode 43b and the electrode 53a, the logic output is not affected by the strain condition of the second sensing device 5. As a result, the logic output remains in a steady "0".

Accordingly, the ternary valued logic system according to an embodiment of the present disclosure has advanced logic functions, which can be extended to develop more logic devices.

In view of the above description, the multi-dimensional strain sensing device according to one or more embodiments of the present disclosure allows separation and quantification of individual strains, and has low power consumption. The ternary valued logic device according to one or more embodiments of the present disclosure may serve as a simple ternary inverter logic (STI). Further, the ternary valued logic system according to one or more embodiments of the present disclosure has advanced logic functions, which can be extended to develop more logic devices. The multi-dimensional strain sensing device, method for sensing types of external motions and for forming ternary valued logic device by the same, and ternary valued logic system paves the way for the development of low-powered and energy-efficient devices in the field of materials science and nano technology, which can have significant implications in various areas, including human-machine interaction, soft robotics and structural health monitoring.

What is claimed is:

1. A multi-dimensional strain sensing device, comprising:
a flexible substrate;
two piezoelectric semiconducting films, formed on opposite sides of the flexible substrate respectively, wherein a first surface of each of the two piezoelectric semiconducting films close to the flexible substrate is zinc-terminated, and a second surface of each of the two piezoelectric semiconducting films away from the flexible substrate is oxide-terminated;
a first pair of electrodes formed on the second surface of one of the two piezoelectric semiconducting films and opposite to the flexible substrate; and
a second pair of electrodes formed on the second surface of the other one of the two piezoelectric semiconducting films and opposite to the flexible substrate,
wherein each of the second surface of the one of the two piezoelectric semiconducting films and the second surface of the other one of the two piezoelectric semiconducting films is a continuous plane, and one of the first pair of electrodes is serially connected to one of the second pair of electrodes.

2. The multi-dimensional strain sensing device according to claim 1, wherein the flexible substrate is a mica substrate.

3. A method for sensing types of external motions by the multi-dimensional strain sensing device according to claim 1, comprising:
applying a voltage to one of the first pair of electrodes and one of the second pair of electrodes;
detecting amounts of currents flow through the two piezoelectric semiconducting films respectively by grounding the other one of the first and second pairs of electrodes; and
determining a sensing type of pressure, force or tactile applied to the multi-dimensional strain sensing device by comparing changes of the currents in the two piezoelectric semiconducting films.

4. A method for forming a ternary valued logic device by the multi-dimensional strain sensing device according to claim 1, comprising:
applying a voltage or current from an open electrode of the first pair of electrodes and grounding an open electrode of the second pair of electrodes,
wherein the open electrode applied with the voltage or current serves as an input terminal of the ternary valued logic device, the open electrode that is grounded serves as a grounded terminal of the ternary valued logic device, and the one electrode of the first pair of electrodes and the one electrode of the second pair of electrodes serve as a linked terminal of the ternary valued logic device,
wherein a response of the ternary valued logic device is obtained by measuring a voltage across the linked terminal and the grounded terminal.

5. A ternary valued logic system, comprising:
a first sensing device which is the multi-dimensional strain sensing device according to claim 1; and
a second sensing device, comprising:

another flexible substrate;

other two piezoelectric semiconducting films, formed on opposite sides of the another flexible substrate respectively, wherein a first surface of each of the other two piezoelectric semiconducting films close to the flexible substrate is zinc-terminated, and a second surface of each of the other two piezoelectric semiconducting films away from the flexible substrate is oxide-terminated;

another first pair of electrodes formed on the second surface of one of the other two piezoelectric semiconducting films and opposite to the another flexible substrate; and another second pair of electrodes formed on the second surface of the other one of the other two piezoelectric semiconducting films and opposite to the another flexible substrate, wherein each of the second surface of the one of the other two piezoelectric semiconducting films and the second surface of the other one of the other two piezoelectric semiconducting films is a continuous plane, one electrode of the first pair of electrodes of the first sensing device is connected in series with one electrode of the another first pair of electrodes of the second sensing device, one electrode of the second pair of electrodes of the first sensing device is connected in parallel with one electrode of the another second pair of electrodes of the second sensing device, and the other electrode of the second pair of electrodes of the first sensing device and the other electrode of the another second pair of electrodes of the second sensing device are grounded.

\* \* \* \* \*